United States Patent
Yeo et al.

(10) Patent No.: US 12,231,547 B2
(45) Date of Patent: Feb. 18, 2025

(54) USING SECURE MULTI-PARTY COMPUTATION AND PROBABILISTIC DATA STRUCTURES TO PROTECT ACCESS TO INFORMATION

(71) Applicant: Google LLC, Mountain View, CA (US)

(72) Inventors: Kevin Wei Li Yeo, New York City, NY (US); Gang Wang, Frederick, MD (US)

(73) Assignee: Google LLC, Mountain View, CA (US)

( * ) Notice: Subject to any disclaimer, the term of this patent is extended or adjusted under 35 U.S.C. 154(b) by 193 days.

(21) Appl. No.: 17/924,561

(22) PCT Filed: Dec. 13, 2021

(86) PCT No.: PCT/US2021/063024
§ 371 (c)(1),
(2) Date: Nov. 10, 2022

(87) PCT Pub. No.: WO2022/132617
PCT Pub. Date: Jun. 23, 2022

(65) Prior Publication Data
US 2023/0188329 A1     Jun. 15, 2023

Related U.S. Application Data

(60) Provisional application No. 63/125,142, filed on Dec. 14, 2020.

(51) Int. Cl.
*H04L 9/08* (2006.01)
*G06F 16/28* (2019.01)
*G06F 21/62* (2013.01)

(52) U.S. Cl.
CPC ............ *H04L 9/085* (2013.01); *G06F 16/285* (2019.01); *G06F 21/6218* (2013.01); *H04L 2209/46* (2013.01)

(58) Field of Classification Search
CPC ... H04L 9/085; H04L 2209/46; G06F 16/285; G06F 21/6218
(Continued)

(56) References Cited

U.S. PATENT DOCUMENTS

2016/0180373 A1  6/2016  Xu et al.
2020/0186356 A1*  6/2020  Veeningen ............... H04L 9/008
2020/0336313 A1  10/2020  Knox

FOREIGN PATENT DOCUMENTS

JP      2017-215968     12/2017
JP      2023-511649      3/2023

OTHER PUBLICATIONS

International conference on Signal Processing, Communication, Power and Embedded System (SCOPES)-2016 Secure Multiparty Computation using Secret Sharing Kinjal Patel © 2016 IEEE (Year: 2016).*

(Continued)

*Primary Examiner* — Benjamin A Kaplan
(74) *Attorney, Agent, or Firm* — Fish & Richardson P.C.

(57) ABSTRACT

This document describes systems and techniques for protecting the security of information in content selection and distribution. In one aspect, a method includes receiving, by a first computing system of MPC systems, a digital component request including distributed point functions that represent a secret share of a respective point function that indicates whether a user of the client device is a member of a first user group. Selection values are identified. Each selection value corresponds to a respective digital component, a set of contextual signals, and a respective second user group identifier for a respective second user group to which the respective digital component is eligible to be distributed. A determination is made, for each selection value and using the distributed point functions in a secure MPC process, a (Continued)

candidate parameter that indicates whether the second user group identifier matches a user group that includes the user as a member.

20 Claims, 5 Drawing Sheets

(58) Field of Classification Search
USPC .......................................................... 713/193
See application file for complete search history.

(56) References Cited

OTHER PUBLICATIONS

A Pragmatic Introduction to Secure Multi-Party Computation David Evans, Vladimir Kolesnikov, and Mike Rosulek NOW Publishers, 2018. (Version Updated: Apr. 15, 2020) (Year: 2020).*

Office Action in Japanese Appln. No. 2022-570382, mailed on Feb. 5, 2024, 4 pages (with English translation).

International Preliminary Report on Patentability in International Appln. No. PCT/US2021/063,024, mailed on Jun. 29, 2023, 9 pages.

Notice of Allowance in Japanese Appln. No. 2022-570382, mailed on Jun. 3, 2024, 5 pages (with English translation).

Boyle et al., "Function secret sharing: Improvements and extensions." Proceedings of the 2016 ACM SIGSAC Conference on Computer and Communications Security, Oct. 2016, 12 pages.

Burkhart et al., "{SEPIA}:{Privacy-Preserving} Aggregation of {Multi-Domain} Network Events and Statistics." 19th USENIX Security Symposium (USENIX Security 10), 2010, 17 pages.

Github.com [online], "TurtleDove" Jan. 2020, retrieved on Jan. 23, 2023, retrieved from URL <https://github.com/michaelkleber/turtledove>, 2 pages.

International Search Report and Written Opinion in International Appln. No. PCT/US2021/063,024, mailed on Apr. 4, 2022, 14 pages.

Nishide et al., "Multiparty computation for interval, equality, and comparison without bit-decomposition protocol." International Workshop on Public Key Cryptography. Springer, Berlin, Heidelberg, Apr. 2007, 343-360.

Pagh et al., "Cuckoo hashing" Journal of Algorithms, vol. 51, Issue 2, May 2004, 122-144.

Wikipedia.org [online], "Cuckoo filter" created on Nov. 2018, retrieved on Jan. 23, 2023, retrieved from URL <https://en.wikipedia.org/wiki/Cuckoo_filter>, 2 pages.

Wikipedia.org [online], "Cuckoo Hashing" created on Feb. 2006, retrieved on Jan. 23, 2023, retrieved from URL <https://en.wikipedia.org/wiki/Cuckoo_hashing>, 8 pages.

Wikipedia.org [online], "PP (complexity)" created May 2004, retrieved on Jan. 23, 2023, retrieved from URL <https://en.wikipedia.org/wiki/PP_(complexity)>, 3 pages.

Wikipedia.org [online], "Private Information Retrieval" Nov. 2004, retrieved on Jan. 23, 2023, retrieved from URL <https://en.wikipedia.org/wiki/Private_information_retrieval>, 6 pages.

Wikipedia.org [online], "Shamir's secret sharing" created on Apr. 2007, retrieved on Jan. 23, 2023, retrieved from URL <https://en.wikipedia.org/wiki/Shamir%27s_Secret_Sharing>, 7 pages.

* cited by examiner

USING SECURE MULTI-PARTY COMPUTATION AND PROBABILISTIC DATA STRUCTURES TO PROTECT ACCESS TO INFORMATION

CROSS-REFERENCE TO RELATED APPLICATIONS

This application is a National Stage Application under 35 U.S.C. § 371 and claims the benefit of International Application No. PCT/US2021/063024, filed Dec. 13, 2021, which claims the benefit of priority to U.S. Application Ser. No. 63/125,142, filed Dec. 14, 2020, both of which are incorporated by reference herein in their entireties and for all purposes.

TECHNICAL FIELD

This specification is related to cryptography and data security.

BACKGROUND

Secure multi-party computation (MPC) is a family of cryptographic protocols that prevents access to data by distributing a computation across multiple parties such that no individual party can access another party's data. The MPC computing systems perform the computations using secret shares of the data. Probabilistic data structures are data structures that use hash functions to represent a set of elements and can be queried to determine whether an element is included in the set represented by the data structure. Example probabilistic data structures include Bloom filters and cuckoo filters.

SUMMARY

In general, one innovative aspect of the subject matter described in this specification can be embodied in methods that include receiving, from a client device and by a first computing system of multiple multi-party computation (MPC) systems, a digital component request including distributed point functions that each represent a secret share of a respective point function that indicates whether a user of the client device is a member of a respective first user group identified by a respective first user group identifier; identifying multiple selection values, wherein each selection value corresponds to a respective digital component, a set of contextual signals, and a respective second user group identifier for a respective second user group to which the respective digital component is eligible to be distributed; determining, for each selection value and using the distributed point functions in a secure MPC process performed in collaboration with one or more second computing systems of the plurality of MPC systems, a candidate parameter that indicates whether the second user group identifier corresponding to the selection value matches a user group that includes the user as a member; generating, based on the selection values and the candidate parameters, a first secret share of a selection result that identifies, from multiple candidate digital components, a given digital component having a highest selection value, wherein each candidate digital component is a digital component for which the candidate parameter for the selection value corresponding to the digital component indicates that the second user group identifier corresponding to the selection value matches a user group that includes the user as a member; and transmitting, to the client device, the first secret share of a selection result identifying the given digital component. Other implementations of this aspect include corresponding apparatus, systems, and computer programs, configured to perform the aspects of the methods, encoded on computer storage devices.

These and other implementations can each optionally include one or more of the following features. In some aspects, determining the candidate parameter for each selection value includes determining a first secret share of the candidate parameter for each selection value.

Generating the first secret share of the selection result can include generating an order of the selection values based on a magnitude of each selection value; determining, based on the order of the selection values and the candidate parameter for each selection value, a first secret share of an accumulated value for each selection value, wherein the accumulated value for each selection value indicates a position of the selection value in a ranked order of the plurality of candidate selection values; determining, for each selection value, a first secret share of a winner parameter based on (i) the candidate parameter for the selection value and (ii) a result of an equality test that indicates whether the accumulated value for the selection value is a specified value; and determining, as the first secret share of the selection result, a first secret share of a sum of, for each selection value, a product of the winner parameter for the selection value and a digital component information element for the selection value.

Determining the first secret share of the accumulated value for each selection value can include, for each individual selection value, determining a quantity of selection values, between a highest selection value and the individual selection value, that have a candidate parameter that indicates that the second user group identifier corresponding to the selection value matches at least one of the one or more first user group identifiers. The specified value can be one.

In some aspects, the distributed point functions are generated based on multiple user groups that include the user of the client device as a member. In some aspects, the digital component request includes a user group request key that is based on a set of contextual signals for a digital component slot and identifying the selection values can include identifying, in a data structure, each selection value that has a lookup key that matches the user group request key.

The subject matter described in this specification can be implemented in particular embodiments so as to realize one or more of the following advantages. Using a secure MPC process performed by two or more MPC servers operated by different parties to select digital components based on secret shares of user information ensures that the user information cannot be accessed in cleartext by either MPC server or another party absent unauthorized collusion between the MPC servers. A client device of a user can generate a probabilistic data structure, e.g., a cuckoo filter, that represents user groups that includes the user as a member and can generate distributed points functions based on the probabilistic data structure. The distributed point functions are secret shares that cryptographically represent whether the user is a member of a user group. Using probabilistic data structures and distributed point functions in this way protects user privacy by preventing access to the user's group membership and reduces the size of the information provided to the MPC cluster. This reduction in data size reduces the amount of bandwidth consumed to transmit the information, reduces the latency in transmitting the information, and reduces the amount of processing power and associated battery power for devices running on batteries (e.g., mobile devices) required to transmit the information.

The MPC cluster can transmit secret shares of a result that identifies a selected digital component that the MPC cluster selected using the secure MPC process. By sending secret shares of a result for only selected digital components rather than information for all or a large set of digital components similarly reduces consumed bandwidth, latency, processing power, and battery power in transmitting and receiving the result. This also reduces the potential leakage of confidential information of content platforms that submit selection values for digital components to the MPC cluster by limiting the number of digital components for which information is provided to the client device.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for protecting the security of information in content selection and distribution. An MPC cluster of server computers can perform a secure MPC process to select digital components based on user information without either MPC server being able to access the user information in cleartext absent unauthorized collusion. The user information can be sent to the MPC cluster using probabilistic data structures and/or distributed point functions to reduce the data size of the information being transmitted over a network and to keep the information secure during the transmission.

Figure 1:
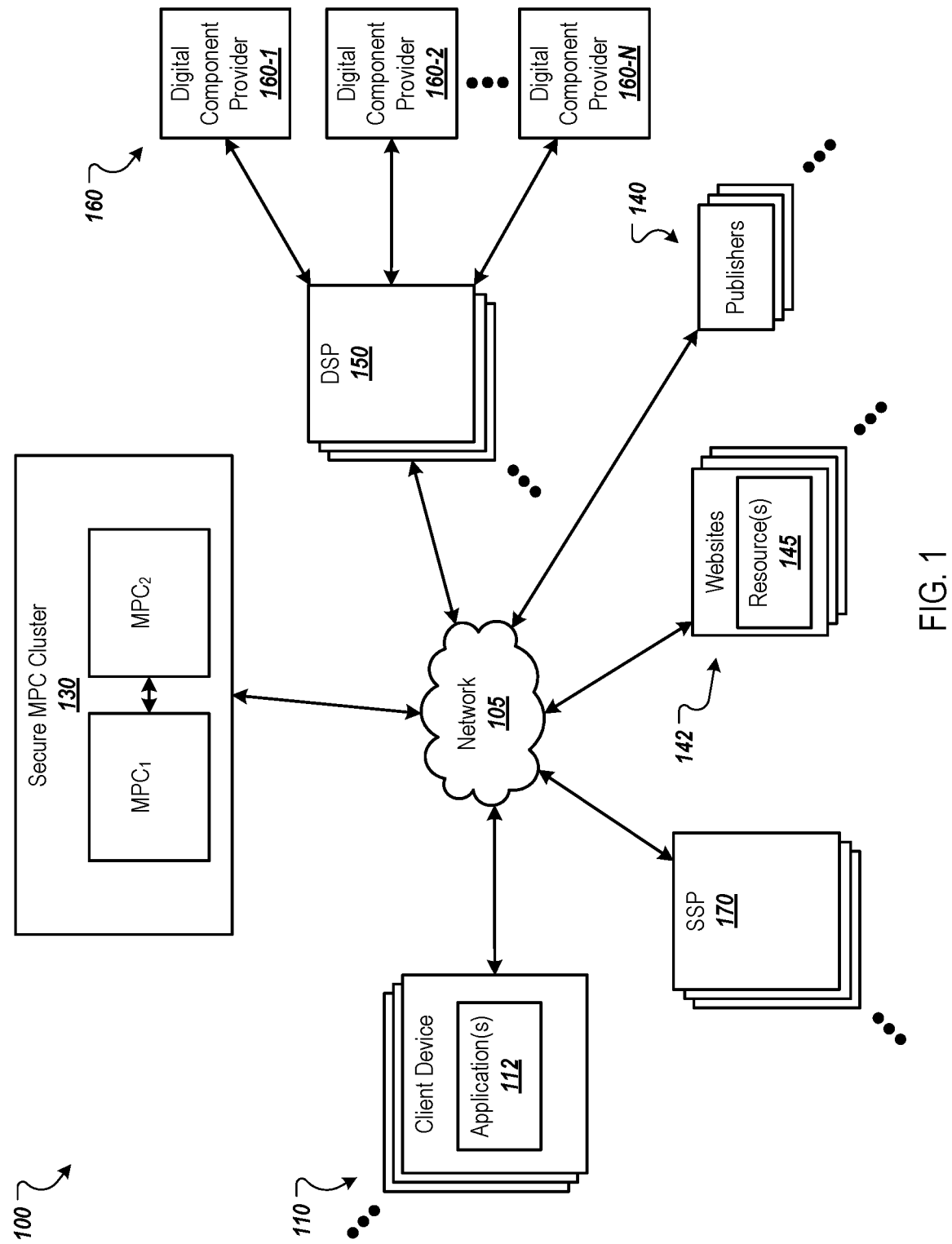
FIG. 1 is a block diagram of an environment in which an MPC cluster performs a secure MPC process to select digital components for distribution to client devices.

FIG. 1 is a block diagram of an environment 100 in which an MPC cluster performs a secure MPC process to select digital components for distribution to client devices 110. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, content platforms, e.g., supply-side platforms (SSPs) 170 and demand-side platforms DSPs (150). The example environment 100 may include many different client devices 110, secure MPC clusters 130, publishers 140, websites 142, DSPs 150, and SSPs 170.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for displaying digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource displayed by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for display to a user of the client device 110. As described below, the application 112 can request digital components from the MPC cluster 130 and/or one or more SSPs 170.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are displayed in digital component slots of publisher's resources and applications. The digital component providers 160 can use a DSP 150 to manage the provisioning of its digital components for display in digital component slots. A DSP 150 is a technology platform implemented in hardware and/or software that automates the process of distributing digital components for display with the resources and/or applications. A DSP 150 can interact with multiple supply-side platforms SSPs on behalf of digital component providers 160 to provide digital components for display with the resources and/or applications of multiple different publishers 140. In general, a DSP 150 can receive requests for digital components (e.g., from an SSP), generate (or select) a selection value for one or more digital components created by one or more digital component providers based on the request, and provide data related to the digital component (e.g., the digital component itself) and the selection parameter to an SSP. The selection value can indicate an amount that the digital component provider 160 is willing to provide for display or user interaction with the digital component. The SSP can then select a digital component for display at a client device 110 and provide, to the client device 110, data that causes the client device 110 to display the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources or perform particular actions at the resource (e.g., interact with a particular item displayed on a web page or add the item to a virtual cart). The user groups can be generated by the digital component providers 160. That is, each digital component provider 160 can assign users to their user groups when the users visit electronic resources of the digital component providers 160. The user groups can also be created by the content platforms, e.g., by DSPs 150 and/or SSPs 170.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application (e.g., for a user logged into the browser, application, or the client device 110). The user group list can include a group identifier for each user group that includes the user as a member. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 displays a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The MPC cluster 130 can use the user group membership of a user to select digital components or other content that may be of interest to the user or may be beneficial to the user/user device in another way. For example, such digital components or other content may include data that improves a user experience, improves the running of a user device or benefits the user or user device in some other way. However, the user group identifiers of the user group list of a user can be provided and used to select digital components in ways that prevent the computing systems $MPC_1$ and $MPC_2$ of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process.

The secure MPC cluster 130 includes two computing systems $MPC_1$ and $MPC_2$ (e.g., server computers) that perform secure MPC processes to select digital components for distribution to client devices of users based on the user's group membership, but without accessing the group membership information in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes.

The computing systems $MPC_1$ and $MPC_2$ can be operated by different entities. In this way, each entity may not have access to the users' group membership in cleartext. For example, one of the computing systems $MPC_1$ or $MPC_2$ can be operated by a trusted party different from the users, the publishers 140, the DSPs 150, the SSPs 170, and the digital component providers 160. For example, an industry group, governmental group, or browser developer may maintain and operate one of the computing systems $MPC_1$ and $MPC_2$. The other computing system may be operated by a different one of these groups, such that a different trusted party operates each computing system $MPC_1$ and $MPC_2$. Preferably, the different parties operating the different computing systems $MPC_1$ and $MPC_2$ have no incentive to collude to endanger user privacy. In some implementations, the computing systems $MPC_1$ and $MPC_2$ are separated architecturally and are monitored to not communicate with each other outside of performing the secure MPC processes described in this document.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
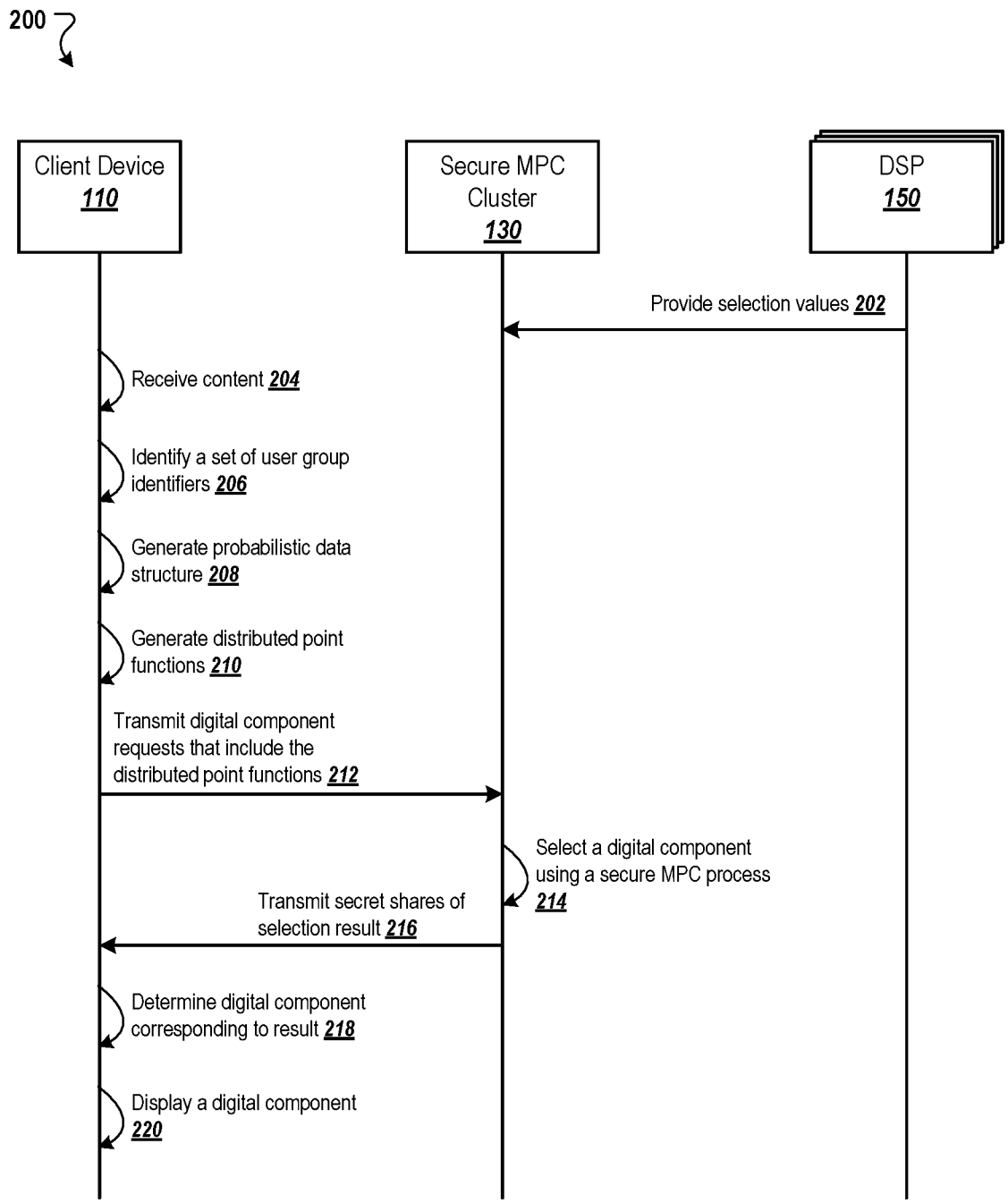
FIG. 2 is a swim lane diagram of an example process for selecting a digital component for display at a client device.

FIG. 2 is a swim lane diagram of an example process 200 for selecting a digital component for display at a client device. Operations of the process 200 can be implemented, for example, by the client device 110, the computing systems $MPC_1$ and $MPC_2$ of the MPC cluster 130, and DSPs 150. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes. In addition, operations of the process 200 can be implemented by SSPs 170.

The DSPs 150 provide selection values for digital components to the MPC cluster 130 (202). In some cases, the DSPs 150 can provide the selection values to the MPC cluster 130 via the SSPs 170. As described above, the selection value can indicate an amount that the digital component provider 160 is willing to provide for display or user interaction with the digital component. The MPC cluster 130 can store the selection value for future digital component requests received from client devices 110. For each digital component, a DSP 150 can also upload additional data, e.g., metadata, for the digital component. The additional data for a digital component can include a user group identifier for a user group corresponding to the digital component. For example, the DSP 150 can manage a campaign in which the digital component is distributed to client devices 110 of users that are members of the user group.

The data for a digital component can include contextual selection signals that indicate the context for which the digital component is eligible, e.g., location of client device 110, spoken language selected for the application 112, and/or Universal Resource Locators (URL) for resources with which the digital component can be displayed. This data for a digital component can also identify the digital component, e.g., using a unique identifier, a domain from which the digital component can be obtained, and/or other appropriate data for the digital component.

In some implementations, the MPC cluster 130 caches, or otherwise stores, selection values for digital components provided to the MPC cluster 130 for digital component requests. In this example, the contextual signals for the digital component and the selection value can include the contextual signals included in that digital component request.

In some implementations, each computing system $MPC_1$ and $MPC_2$ stores the selection values for digital components using a two stage lookup table (LUT). Using a two stage LUT can provide some performance advantages, but other appropriate data structures can also be used. The first stage can be keyed by a user group request key (UG_Request_Key). The UG_Request_Key can be a composite message that is based on a set of contextual signals, e.g., a set of contextual signals of a digital component request (e.g., URL, location, language, etc.) or a set of contextual signals for which a digital component is eligible for distribution. That is, the first stage LUT can be keyed based on a set of contextual signals. The key for the first stage can be a hash of the UG_Request_Key, e.g., using a hash function such as SHA256. This key can be truncated to a specified number of bits, e.g., to 16 bits, 32 bits, or another appropriate number of bits. The value for each key UG_Request_Key in the first stage LUT can indicate a second stage LUT that includes data for digital components that are eligible for digital component requests that include the contextual signals of the UG_Request_Key. For example, the two stage LUT can have a respective second stage LUT for each unique key UG_Request_Key. An example first stage LUT is shown below as Table 1.

TABLE 1

| Key | Value |
|---|---|
| SHA256(UG_Request_Key) | Second Stage LUT |
| ... | ... |

The second stage LUT can be keyed based on user group identifiers. In some implementations, e.g., if the second stage LUT is a single table that includes data for multiple keys UG_Request_Key, the second stage LUT can be keyed based on a combination of the key UG_Request_Key and the user group identifiers. In this example, the value for each SHA256(UG_Request_Key) is a pair [begining_row, ending_row] to specify a subsection (i.e. contiguous rows) of the LUT corresponding to SHA256(UG_Request_key). Each row in the second stage LUT can be for a particular selection value for a particular digital component. For example, a DSP 150 can submit different selection values for the same digital component, with each selection value being for a different set of contextual signals and/or different user group identifiers. Thus, the selection values for a digital component can vary based on context.

A DSP 150 or digital component provider 160 can associate, e.g., link or map, a digital component to a user group to which the DSP 150 or digital component provider wants the digital component to be displayed. For example, a DSP 150 may want a digital component related to men's basketball shoes to be displayed to men that have shown an interest in basketball and/or shoes. In this example, the DSP 150 can provide, to the MPC cluster 130, data indicating that the digital component corresponds to the user group identifier for a user group that includes men that have shown an interest in basketball and/or shoes.

In some implementations, the key for a row in the second stage LUT can be a hash or code generated based on the combination of the user group request key UG_Request_Key and the user group identifier for the digital component of the row. For example, the key can be a hash-based message authentication code (HMAC) of the combination, which can be represented as $HMAC_{SHA256}$ (UG_Request_Key, ug_id). The user group identifier ug_id can be based on a combination of an internal user group identifier for the user group and a domain of the owner of the user group (e.g., of the DSP, SSP, or digital component provider that owns the user group). For example, the user group identifier ug_id can be a digital digest of the eTLD+1 of the owner domain and the owner's internal user group identifier for the user group. The eTLD+1 is the effective top-level domain (eTLD) plus one level more than the public suffix. An example eTLD+1 is "example.com" where ".com" is the top-level domain. The ug_id can be truncated to 16 bytes or another appropriate data size.

Continuing the previous men's basketball shoes example, the second stage lookup key for the row that includes information for the digital component that is to be displayed to users in the men's basketball shoes group can be a combination of the user group request key UG_Request_Key and the user group identifier ug_id for the men's basketball shoes group. As the digital component can be displayed in different contexts, the second stage lookup table can include multiple rows for the digital component associated with different user group identifiers, including the user group identifier ug_id for the men's basketball shoes group, each with different user group request key UG_Request_Key and different values.

The value for each row of the second stage LUT can be the selection value for the digital component and other data for the digital component, e.g., metadata that identifies the digital component or the network location from which the digital component can be downloaded, etc. The value can be a digital component information element dc_information_element, which can be a byte array having the selection value and the metadata. The byte array can have a particular format that applications 112 or trusted programs of client devices 110, and the computing systems $MPC_1$ and $MPC_2$ can parse to obtain the selection value and metadata. An example second stage LUT is shown below as Table 2.

TABLE 2

| Key | Value |
|---|---|
| HMAC(UG_Request_Key, UG_ID) | {selection value, metadata} |
| ... | ... |

The second stage LUT maps a selection value to a particular digital component, a particular user group identifier ug_id and to a particular set of contextual signals defined by the first stage lookup key UG_Request_Key, which can, in some cases, be present in the calculation of the second stage LUT key. By doing so, the second stage LUT indicates the particular context of a digital component slot for which the selection value for the digital component is intended. This allows a DSP 150 or digital component provider 160 to specify different selection values for the same digital component for different contexts defined by the contextual signals and a user's group membership. When a digital component request is received that indicates that the user to which the digital component will be displayed is a member of a particular user group identified by a particular user group identifier ug_ig and the digital component will be displayed in a particular context defined by the contextual signals of the first stage lookup key, any selection values in the second stage LUT that has a matching user group identifier and a matching first stage lookup key is a candidate for being selected for distribution in response to the request.

The client device 110 receives content (204). For example, the client device 110 can receive an electronic resource (e.g., web page) for display by a web browser or application content for display by a native application. The content can include one or more digital component slots that include computer-readable code, e.g., scripts, that, when executed, cause the client device 110 to request a digital component for each slot. The client device 110 can render the content on a display of the client device 110.

The client device 110 identifies a set of user group identifiers (206). The set of user group identifiers can be the user group identifiers for the user groups that include the user as a member. For example, the set of user group identifiers can be the user group identifiers in the user group list. The application 112 that renders the content or a trusted program can identify the set of user group identifiers, e.g., by accessing the user group list from secure storage of the client device 110.

The client device 110 generates a probabilistic data structure (208). The application 112 or the trusted program can generate the probabilistic data structure using the set of user group identifiers. In some implementations, the probabilistic data structure is a cuckoo filter with tables using two hash functions $F_1$ and $F_2$. Cuckoo hashing is a hashing method that uses two (or more) tables with a total (1+\epsilon)N entries to store N items, e.g., user group identifiers, such that each entry will contain at most one item. In addition, each item, e.g., user group identifier, will appear in one of two entries defined by one of two hash functions $F_1$ and $F_2$ whose output is the set [(1+\epsilon)N]. An item associated with key k will appear at either location $F_1(k)$ in the first table or $F_2(k)$ in the second table. For reasonably large N items (e.g., N≥1,000), it is sufficient to use \epsilon=0.1, which means that N items can be hashed with cuckoo hashing where the combined table size is 1.1N. In these expressions, epsilon can be referred to as a load factor.

To build a sparse private information retrieval data structure using a cuckoo filter, up to N user group identifiers are hashed using cuckoo hashing into two tables, which combined have a size of 1.1N or another appropriate size. All empty entries can be replaced with a 0-bit string. To query for a user group identifier associated with key k, the user group identifier (if it exists in the data structure) will appear at entry $F_1(k)$ in the first table or $F_2(k)$ in the second table. Using table size C=1.1N would result in 1≤$F_1$(ug_id), $F_2$(ug_id)≤C.

The client device 110 can generate the cuckoo filter by calculating, for each user group identifier in the set of user group identifiers, both possible locations for the user group identifier using both hash functions F1 and F2. If at least one of the two possible locations is empty, the client device 110 can insert the element into the empty location, which could be in either table, to complete the insertion process for that user group identifier. If both locations are occupied, the client device 110 randomly picks one location and swaps the item currently in the location with the item to be inserted. The client device 110 can then recalculate the two hash functions F1 and F2 and try the insertion again. This process repeats until the insertion is successful or too many attempts have failed for each user group identifier in the set of user group identifiers. After the cuckoo filter is constructed, each user group identifier ug_id is stored in a specific index of the table.

The client device 110 generates distributed point functions (210). The application 112 or the trusted program can generate the distributed point functions using point functions and the cuckoo filter tables. The distributed point functions represent secret shares of the point function. In general, point functions are functions $f^i$: [N]→[N] where f(x)=0 when x!=i and f(i)=1. A secret sharing of a point function $f^i$ is two functions $g^i$: [N]→[N] and $h^i$: [N]→[N] such that $f^i(x)=g^i(x)+h^i(x)$ for all x in the set [N]. Furthermore, given specifications of the function $h^i$ or $g^i$ (but not both), it is impossible to recover the original function $f^i$.

For each ug_id, a point function $G_{ug\_id}$ is needed that can be split into distributed point functions $g_{ug\_id,\,1}$ and $g_{ug\_id,\,2}$ such that, for $\forall j \in [1, C]$, relationships 1 and 2 below are satisfied.

$$G_{ug\_id}(i) = g_{ug\_id,1}(i) + g_{ug\_id,2}(i) = ug\_id \text{ if } i = F_1(ug\_id) \quad (1)$$

$$G_{ug\_id}(i) = g_{ug\_id,1}(i) + g_{ug\_id,2}(i) = 0 \text{ otherwise} \quad (2)$$

Similarly, a point function $H_{ug\_id}$ is needed that can be split into distributed point functions $h_{ug\_id,\,1}$ and $h_{ug\_id,\,2}$ such that, for $\forall j \in [1, C]$, relationships 3 and 4 below are satisfied.

$$H_{ug\_id}(i) = h_{ug\_id,1}(i) + h_{ug\_id,2}(i) = ug\_id \text{ if } i = F_2(ug\_id) \quad (3)$$

$$H_{ug\_id}(i) = h_{ug\_id,1}(i) + h_{ug\_id,2}(i) = 0 \text{ otherwise} \quad (4)$$

That is, the distributed point functions of a particular point function can be evaluated on multiple possible points, e.g., multiple possible user group identifiers, but the result is always zero except for the user group identifier ug_id for the user group that includes the user as a member and for which the distributed point functions were generated. The distributed point functions have a very small data size that can be transmitted over a network without using much bandwidth and with low latency compared with sending other encrypted forms of user group identifiers.

For a given user group identifier, ug_id, point function $F_1$ and the corresponding first table of the cuckoo filter, the client device 110 generates a distributed point function $g_{ug\_id,\,1}$ for computing system $MPC_1$ and a distributed function $g_{ug\_id,\,2}$ for computing system $MPC_2$. Similarly, for a given user group identifier, ug_id, point function $F_2$ and the corresponding second table of the cuckoo filter, the client device 110 generates a distributed point function $h_{ug\_id,\,1}$ for computing system $MPC_1$ and a distributed point function $h_{ug\_id,\,2}$ for computing system $MPC_2$.

The client device 110 transmits, to the MPC cluster 130, a digital component request that includes the distributed point functions (212). The digital component request can include a pair of distributed point functions for each user group identifier ug_id. The client device 110 can transmit a digital component request that includes each distributed point function $g_{ug\_id,\,1}$ and each distributed point function $h_{ug\_id,\,1}$ to computing system $MPC_1$. The digital component request can include the first stage lookup key, e.g., SHA256 (UG_Request_Key). The client device 110 can generate the first stage lookup key based on contextual signals for the digital component request. For example, the client device 110 can generate the first stage lookup key by generating a composite message that includes contextual signals, such as the URL of the resource with which a selected digital component will be displayed, the location of the client device 110 submitting the digital component request, the spoken language of the application 112 that will display a selected digital component, etc. The client device 110 can then apply a hash function, e.g., an SHA256 function, to the composite message to generate the first stage lookup key.

Similarly, the client device 110 can transmit a digital component request that includes each distributed point function $g_{ug\_id,\,2}$ and each distributed point function $h_{ug\_id,\,2}$ to computing system $MPC_2$. This digital component request can also include the first stage lookup key, e.g., SHA256 (UG_Request_Key). As the contextual signals are the same, the first stage lookup key can be the same for the digital component requests sent to the two computing systems $MPC_1$ and $MPC_2$ of the MPC cluster 130.

The computing system $MPC_1$ can create a vector of additive secret shares $[M_1] = [m_{1,\,1}, \ldots m_{C,\,1}]$, where $m_{i,1} = \Sigma_{ug\_id}\, g_{ug\_id,1}(i)$ for $1 \leq i \leq C$. Brackets are used in this document to represent secret shares of a secret. The subscript after the comma is used to designate the secret share, e.g., gug_id, 1 is the first secret share and gug_id, 2 is the second secret share. Similarly, computing system $MPC_2$ can create a vector of additive secret shares $[M_2] = [m_{1,\,2}, \ldots m_{C,\,2}]$, where $m_{i,\,2} = \Sigma_{ug\_id}\, g_{ug\_id,2}(i)$ for $1 \leq i \leq C$. In this example, secret share $[m_{i,\,1}]$ and $[m_{i,2}]$ are additive secret shares of $G_{ug\_id}(i)$ and $[M_1]$ and $[M_2]$ are two additive secret shared of M, i.e., vector of dimension C, where $M_i = G_{ug\_id}(i)$. The secret shares can be generated using Shamir's secret sharing or another appropriate secret sharing technique. The computing systems $MPC_1$ and $MPC_2$ can generate similar vectors for the point functions $h_{ug\_id,\,1}(i)$ and $h_{ug\_id,\,1}(i)$.

Figure 3:
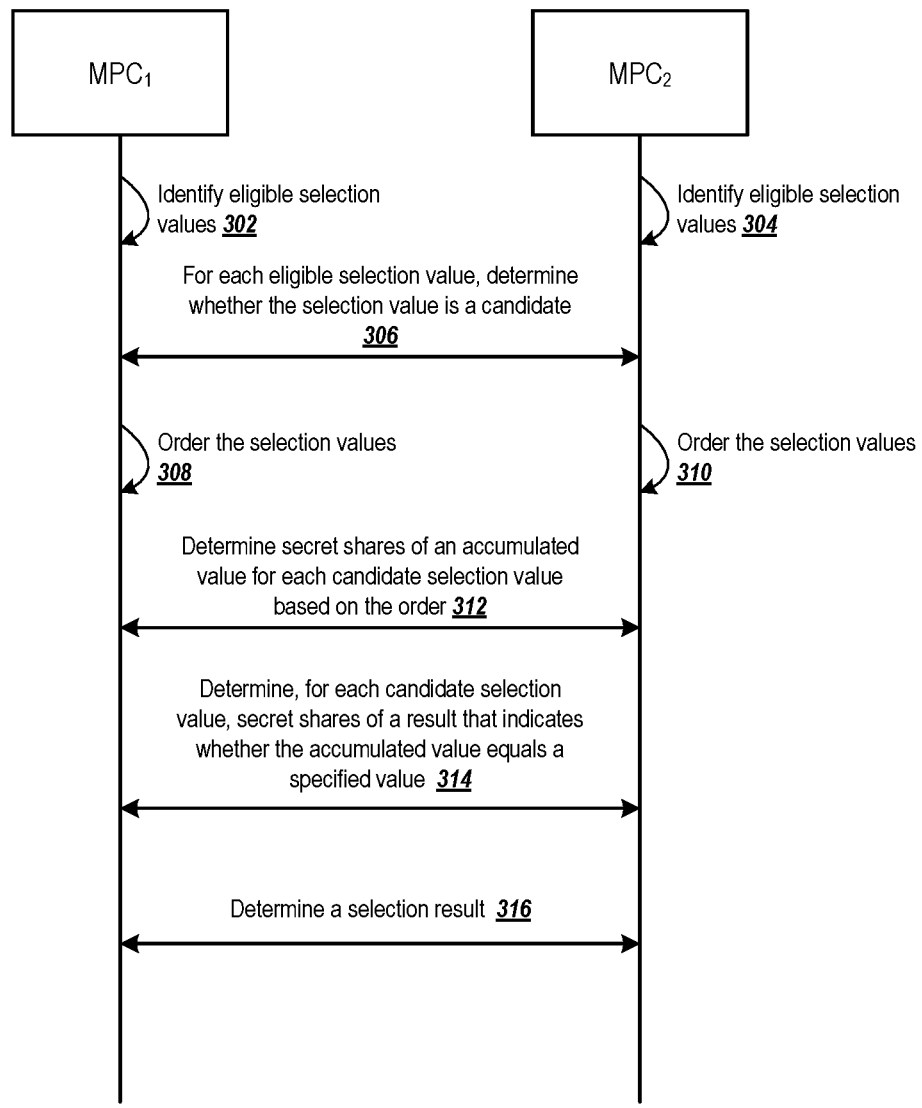
FIG. 3 is a swim lane diagram of an example process for selecting a digital component for distribution to a client device.

The MPC cluster 130 performs a secure MPC process using the distributed point functions to select a digital component based on the user groups that includes the user of the client device 110 as a member (214). This can include identifying eligible selection values for digital components in the two stage lookup table of the computing systems $MPC_1$ and $MPC_2$ using the first stage lookup key. This can also include identifying selection values for digital components that are candidates for selection based on the digital components having a user group identifier that matches one of the user group identifiers for the user. This can also include selecting a digital component from the candidate digital components based on the selection values for the digital components. This can all be performed without either computing system $MPC_1$ or $MPC_2$ from accessing the user group identifiers in cleartext. An example process for selecting a digital component using a secure MPC process is illustrated in FIG. 3 and described below.

The MPC cluster 130 transmits secret shares of a selection result to the client device 110 (216). The selection result can be in the form of a byte array that includes information about the selected digital component. For example, the selection result can be a byte array that includes the value for the digital component in the second LUT, e.g., the selection value for the digital component and the metadata for the digital component. The computing systems $MPC_1$ and $MPC_2$ can determine, using the secure MPC process, the secret shares of the selection result, as described in more detail below. The computing system $MPC_1$ can transmit a first secret share of the selection result to the client device 110 and the computing system $MPC_2$ can send a second secret share of the selection result to the client device 110. To prevent the computing systems $MPC_1$ and $MPC_2$ from knowing the selected digital component, the computing systems $MPC_1$ and $MPC_2$ can be prevented from sharing their secret shares of the selection result with each other. For example, computing systems $MPC_1$ and $MPC_2$ can independently encrypt its secret share using the application's (e.g., browser's) public key.

When a two table cuckoo filter is used, the MPC cluster 130 can provide secret shares of two selection results, one for each table. However, retrieving two user group list selection values for two digital components facilitates selection value scrapping. To reduce this risk, the MPC cluster 130 can use another secure MPC technique to return at most one selection result with the highest selection value, as described below.

The client device 110 determines a digital component that corresponds to the selection result(s) (218). For each selection result for which the client device 110 receives two secret shares from the computing systems $MPC_1$ and $MPC_2$, the client device 110 can determine the selection result from the two secret shares. For example, using an additive secret share library as described in more detail below, the client device 110 can add the two secret shares of the selection result together to obtain the selection result in cleartext. This gives the client device 110 access to the selection value for the digital component and the metadata for the digital component, e.g., the identity of the digital component, the location from which the client device 110 can download the digital component, etc.

The client device 110 can display a digital component (220). For example, the application 112 can display the digital component with the content received in step 204. In some implementations, the client device 110 can display the digital component of the selection result. If two selection results are received, the client device 110 (e.g., the application 112) can select the digital component having the highest selection value and display the selected digital component.

In some implementations, the client device 110 can request a digital component based on user group membership from the MPC cluster 130. The client device 110 can also request digital components based on contextual signals from an SSP 170. These contextual signals can include the same contextual signals described above, and optionally additional contextual signals such as the number of digital component slots of the resource, the types of digital component slots, the types and/or format of digital components that can be displayed with the resource, etc. The SSP 170 can select one or more digital components based on the contextual signals and selection values for the digital components and provide one or more of the selected digital components (or data identifying the digital components) and the selection values for the digital component(s) to the client device 110. The client device 110 can then select, from a set of digital components that include the digital component of the selection result received from the MPC cluster 130 and the digital component(s) selected by the SSP 170, a digital component to display with the resource.

If a resource includes multiple digital component slots, the client device 110 can request a respective digital component for each slot from the MPC cluster 130 and from the SSP 170. To reduce consumed bandwidth and latency, the client device 110 can transmit the distributed point functions for the user once for all of the digital component slots.

Although the steps for generating the cuckoo filter and the distributed point functions are shown in FIG. 2 as being performed after receiving content, the client device 110 can generate the cuckoo filter and the distributed point functions prior to receiving the content. For example, the client device 110 can generate and cache the cuckoo filter and distributed point functions periodically or in response to the user group membership for the user being updated.

FIG. 3 is a swim lane diagram of an example process 300 for selecting a digital component for distribution to a client device. Operations of the process 300 can be implemented, for example, by the computing systems $MPC_1$ and $MPC_2$ of the MPC cluster 130. Operations of the process 300 can also be implemented as instructions stored on one or more computer readable media which may be non-transitory, and execution of the instructions by one or more data processing apparatus can cause the one or more data processing apparatus to perform the operations of the process 300.

The computing system $MPC_1$ identifies eligible selection values (302). The computing system $MPC_1$ can identify eligible selection values for a digital component request received from a client device 110, e.g., as described above with reference to FIG. 2. The digital component request can include, for each user group that includes the user of the client device as a member, the distributed point function $g_{ug\_id, 1}$ generated by the client device 110 for the user group identifier ug_id using the hash function $F_1$. The digital component request can also include the distributed point function $h_{ug\_id, 1}$ generated by the client device 110 for the user group identifier ug_id using the hash function $F_2$. The digital component request can also include the first stage lookup key, e.g., SHA256(UG_Request_Key), generated based on the contextual signals for the digital component request.

The computing system $MPC_1$ can identify the eligible selection values using the first stage lookup key of the digital component request. The computing system $MPC_1$ can access the first stage LUT and use the first stage lookup key to identify the rows of the second stage LUT that include information for a selection value for a digital component that is eligible to displayed, e.g., for which a selection value has been received, for the set of contextual signals represented by the first stage lookup key. For example, as described above, each row of the second stage LUT includes information for a digital component and a second stage lookup key that is based on a set of contextual signals. Thus, the computing system $MPC_1$ can use the first stage lookup key to identify rows of the second stage LUT that have a set of contextual signals that match the set of contextual signals defined by the first stage lookup key received in the digital component request. These rows include information for digital components that are eligible to be displayed or have eligible selection values for the context defined by the first stage lookup key received in the digital component request.

The computing system $MPC_2$ identifies eligible selection values (304). The computing system $MPC_2$ can identify eligible selection values for a digital component request received from a client device 110. This digital component request can include, for each user group that includes the user of the client device as a member, the distributed point function $g_{ug\_id, 2}$ generated by the client device 110 for the user group identifier ug_id using the hash function $F_1$. The digital component request can also include the distributed point function $h_{ug\_id, 2}$ generated by the client device 110 for the user group identifier ug_id using the hash function $F_2$. The digital component request can also include the first stage lookup key, e.g., SHA256(UG_Request_Key), generated based on the contextual signals for the digital component request.

The first stage lookup key of the digital component requests received by computing system $MPC_2$ can be the same as the first stage lookup key received by computing system $MPC_1$. Each distributed point function $g_{ug\_id, 2}$ can be generated based on the same distributed point function $G_{ud\_id}$ as a corresponding distributed point function received by computing system $MPC_1$. That is, for a user group identifier ud_id for a user group that includes the user as a member, the client device 110 can generate the distributed functions $g_{ug\_id, 1}$ and $g_{ug\_id, 2}$ of the digital component requests using the hash function $F_1$. Similarly, for a user group identifier ud_id for a user group that includes the user as a member, the client device 110 can generate the distributed functions $h_{ug\_id, 1}$ and $h_{ug\_id, 2}$ of the digital component requests using the hash function $F_2$.

For brevity, the remaining steps of the process 300 are described in terms of selecting a digital component for distribution to the client device 110 in response to a digital component request in terms of the distributed point functions for the hash function $F_1$. However, the same steps can be performed for the distributed point functions for the hash function $F_2$. This can result in two selected digital components and the MPC cluster 130 can perform additional operations to select one of the two digital components, as described below.

The computing system $MPC_2$ can identify the eligible selection values using the first stage lookup key of the digital component request. The computing system $MPC_2$ can access the first stage LUT and use the first stage lookup key to identify the rows of the second stage LUT that include information for a digital component that is eligible to displayed, e.g., for which a selection value has been received, for the set of contextual signals represented by the first stage lookup key. As described above, each computing system $MPC_1$ and $MPC_2$ can maintain a respective two stage LUT that includes the same information.

For each eligible selection value, the computing systems $MPC_1$ and $MPC_2$ determine whether the selection value and its digital component is a candidate for being selected for distribution to the client device 110 in response to the digital component requests (308). The candidate selection values are the eligible selection values for digital components that have a user group identifier that matches a user group identifier for the user, e.g., a user group identifier for a user group that includes the user as a member. As described above, each digital component can be mapped to one or more user groups that includes members to which the DSP 150 or digital component provider 160 indicated that the digital component should be displayed. This information (i.e., ug_id) is part of the second stage lookup key for the second stage LUT, as described above.

A digital component of a row in the second stage LUT is a candidate for selection if its user group identifier ug_id that is part of the second stage lookup key for the row matches one of the user group identifiers of the user. Conceptually, to determine whether a digital component is a candidate using a two table cuckoo filter to represent a user's group membership, a computing system can determine whether the user group identifier ug_id of the second stage lookup key matches one of the two tags in one of the two cuckoo filter locations.

The computing systems $MPC_1$ and $MPC_2$ can identify the candidate selection values using secure MPC techniques using secret shares such that neither computing system $MPC_1$ nor $MPC_2$ knows which digital components are candidates or the user groups that include the user as a member. To do this, computing system $MPC_1$ calculates a first share of a candidate parameter is_dc_a_candidate for each digital component of a row in the second stage LUT that is a candidate for selection. Similarly, computing system $MPC_2$ calculates a second share of the candidate parameter is_dc_a_candidate for each digital component of a row in the second stage LUT that is a candidate for selection. The candidate parameter is_dc_a_candidate can be a Boolean value (e.g., zero or one) that indicates whether selection values and corresponding digital components linked to the user group identifier ug_id are candidates.

The first share of the candidate parameter is_dc_a_candidate for a digital component dc can be represented as [is_dc_a_candidate$_{dc,\ 1}$] and the second share of the candidate parameter is_dc_a_candidate can be represented as [is_dc_a_candidate$_{dc,\ 2}$]. The first secret share of the candidate parameter for a digital component dc of a row in the second stage LUT that is a candidate for selection and is associated with user group identifier ug_id is a secret share of a Boolean ug_id==[$m_{F_1(ug\_id),1}$], which is equivalent to ug_id==[$g_{ug\_id,1}(F_1(ug\_id))$]. The second secret share of the candidate parameter for a digital component dc of a row in the second stage LUT that is a candidate for selection and is associated with user group identifier ug_id is a secret share of a Boolean ug_id==[$m_{F_1(ug\_id),2}$], which is equivalent to ug_id==[$g_{ug\_id,1}(F_1(ug\_id))$]. The symbol "==" represents an equality test, which is true (or 1) if the two values are equal or false (or 0) if the values are not equal.

The computing systems $MPC_1$ and $MPC_2$ can compute the secret shares [is_dc_a_candidate$_{dc,\ 1}$] and [is_dc_a_candidate$_{dc,\ 2}$] for the hash function $F_1$ using secure MPC techniques with one or more roundtrips between the computing systems $MPC_1$ and $MPC_2$ to evaluate the equality expressions of ug_id==[$g_{ug\_id,1}(F_1(ug\_id))$] and ug_id==[$g_{ug\_id,1}(F_1(ug\_id))$]. That is, the computing systems $MPC_1$ and $MPC_2$ can determine the secret shares [is_dc_a_candidate$_{dc,\ 1}$] and [is_dc_a_candidate$_{dc,\ 2}$] for each digital component associated with user group identifier ug_id based on the distributed point functions $g_{ug\_id,\ 1}$ and $g_{ug\_id,\ 2}$ for each user group identifier received from the client device 110 as part of the digital component request.

The computing systems $MPC_1$ and $MPC_2$ can use secret sharing techniques or secret sharing libraries that support the operations shown in Table 3 below. One example secret sharing technique that supports these operations is Security through Private Information Aggregation (SEPIA).

TABLE 3

| Syntax of Operation | Output | Remark |
| --- | --- | --- |
| [a] + [b} | [a + b] | Add two shares for two secrets, respectively. |
| Reconstruct([a$_1$], [a$_2$]) | a | Reconstruct a secret a from its shares a$_1$ and a$_2$. The result is a in plaintext. |
| c × [a] | [c × a] | Multiply a share with a known constant in plaintext. |
| [a] × [b] | [a × b] | Multiply two shares of two secrets, respectively. |
| [a] == b | [1] if a == b, [0] otherwise | Test the equality between a secret a represented as a secret share and a constant plaintext value b. This can require multiple roundtrips between MPC servers. |

The computing system $MPC_1$ determines an order of the selection values (308). Similarly, the computing system $MPC_2$ determines an order of the selection values (310). Each computing system $MPC_1$ and $MPC_2$ can determine an order of the selection values in its second stage LUT. If the two stage LUT includes a second stage LUT for each user group request key UG_Request_Key, this order can include all of the selection values in the second stage LUT, including the candidate selection values and the selection values that are not candidates. The order can be from the highest selection value to the lowest selection value. In some implementations, the selection values used for the order can be the value that would be provided to the publisher of the resource after the selected digital component is displayed, e.g., after any sharing with a DSP 150 and/or SSP 170. As the selection values are in cleartext, the computing systems $MPC_1$ and $MPC_2$ do not have to perform any roundtrip computations to order the selection values. Instead, each computing system $MPC_1$ and $MPC_2$ can order the selection values of its second stage LUT independently. If the selection values were stored as secret shares at each computing system $MPC_1$ and $MPC_2$, with each computing system $MPC_1$ and $MPC_2$ having a respective secret share of each selection value, the computing systems $MPC_1$ and $MPC_2$ can perform a secure MPC process using roundtrip computations to order the selection values.

The computing systems $MPC_1$ and $MPC_2$ determine secret shares of an accumulated value for each candidate selection value (312). Conceptually, the accumulated value for a given selection value for a digital component represents a total number of candidate selection values from the top of the order to the given selection value, including the given selection value if the given selection value is a candidate. This concept is shown in Table 4 below.

TABLE 4

| Ordered Selection Values | is_dc_a_candidate | Accumulated Value (acc) | Is Accumulated Value Equal to 1? |
|---|---|---|---|
| Highest | 0 | 0 | 0 |
| 2$^{nd}$ Highest | 1 | 1 | 1 |
| 3$^{rd}$ Highest | 0 | 1 | 1 |
| 4$^{th}$ Highest | 1 | 2 | 0 |
| ... | ... | ... | ... |

In some implementations, the accumulated value for a given selection value for a digital component represents a total number of candidate selection values from the top of the order to the given selection value, excluding the given selection value if the given selection value is a candidate. In this example, the fourth column would represent whether the accumulated value is equal to zero rather than one. In either case, the accumulated value for each selection value indicates a position of the selection value in a ranked order of the candidate selection values that are candidates for selection based on the selection value being associated with a user group identifier that matches a user group identifier of the user.

In Table 4, the accumulated value (acc) is incremented for each selection value that has a candidate parameter is_dc_a_candidate equal to one as it progresses from the top of the order to the bottom of the order. For example, the accumulated value acc for the highest selection value is zero as the candidate parameter is_dc_a_candidate for the highest selection value is equal to zero. The accumulated value acc for the second selection value is one as the candidate parameter is_dc_a_candidate for the second selection value is equal to one and none of the selection values above the second highest selection value has a candidate parameter is_dc_a_candidate equal to one. Moving down the order, the candidate parameter is_dc_a_candidate for the third highest selection value is zero, so the accumulated value acc for the third selection value is not incremented from the accumulated value acc for the second selection value. As the candidate parameter is_dc_a_candidate for the fourth highest selection value is one, the accumulated value acc for the fourth highest selection value is incremented by one from the accumulated value acc for the third highest selection value. Thus, the accumulated value acc for the fourth highest selection value is equal to two as there are two selection values that have a candidate parameter is_dc_a_candidate from the highest selection value to the fourth highest selection value, inclusive.

Using this table, the computing systems $MPC_1$ and $MPC_2$ would select, for distribution to the client device 110, the digital component corresponding to the selection parameter for which the candidate parameter is_dc_a_candidate has a value of one and the accumulated value acc has a value of one, as indicated in the fourth column of Table 4. This represents the highest ordered selection value for which the candidate parameter is_dc_a_candidate has a value of one. As the candidate parameter is_dc_a_candidate is in secret shares for the computing systems $MPC_1$ and $MPC_2$ to maintain user privacy and ensure that user data is not leaked, the computing systems $MPC_1$ and $MPC_2$ determine secret shares of the accumulated value acc for each selection value and use roundtrip computations to determine which selection value has an accumulated value acc that is equal to one and a candidate parameter is_dc_a_candidate that is equal to one.

The computing systems $MPC_1$ and $MPC_2$ can determine their secret shares of the accumulated value acc for each selection value independently without any roundtrip computations. For example, computing system $MPC_1$ can determine, for each selection value and its corresponding digital component dc, a first share $[acc_{dc,\ 1}]$ of the accumulated value acc by traversing all of the selection values in order from highest to lowest and summing the candidate parameters is_dc_a_candidate for the selection values along the way, as described above with reference to Table 4. Similarly, computing system $MPC_2$ can determine, for each selection value and its corresponding digital component dc, a second share $[acc_{dc,\ 2}]$ of the accumulated value acc by traversing all of the selection values in order from highest to lowest and summing the candidate parameters is_dc_a_candidate for the selection values along the way.

The computing systems $MPC_1$ and $MPC_2$ determine, for each selection value, secret shares of a result that indicates whether the accumulated value has a specified value (314). The specified value can be a value of one, as shown in columns 3 and 4 of Table 4. As described above, the selection value for which the accumulated value acc is one and the candidate parameter is_dc_a_candidate is one is the highest selection value among the candidate selection values.

The computing systems $MPC_1$ and $MPC_2$ can engage in multiple rounds of computations, e.g., multiple remote procedure calls (RPCs), as part of a secure MPC process to calculate the equality operation $acc_{dc}=1$ in terms of secret shares for each selection value. At the end of this process, computing system $MPC_1$ has, for each selection value, one secret share of the result $acc_{dc}=1$, and computing system $MPC_2$ has, for each selection value, the other secret share of the result $acc_{dc}=1$.

The computing systems $MPC_1$ and $MPC_2$ determine a selection result (316). The computing systems $MPC_1$ and $MPC_2$ can determine the selection result based on, for each selection value, the secret shares of the $acc_{dc}=1$ and the secret shares of the candidate parameter is_dc_a_candidate$_{dc}$. To do so, the computing systems $MPC_1$ and $MPC_2$ can calculate a winner parameter is_dc_the_winner$_{dc}$ in terms of secret shares. The winner parameter is_dc_the_winner$_{dc}$ can be a Boolean value that indicates whether the selection value is the winner of the selection process, e.g., whether the digital component corresponding to the selection value is selected for distribution to the client device 110 in response to the digital component request.

The winner parameter is_dc_the_winner$_{dc}$ for a selection value can be based on the candidate parameter is_dc_a_candidate$_{dc}$ for the selection value and whether the accumulated value acc for the selection value is equal to the specified value, e.g., equal to one or zero depending on how the fourth column of Table 4 is determined. In the example that follows, the MPC cluster 130 can determine, for each selection value, a product of these two parameters. Other techniques can also be used to determine whether both the candidate parameter is_dc_a_candidate$_{dc}$ is true or one and the accumulated value is equal to the specified value.

Each computing system MPC$_1$ and MPC$_2$ can independently calculate, for each selection value, the winner parameter is_dc_the_winner$_{dc}$==(is_dc_a_candidate$_{dc}$× (acc$_{dc}$==1)) in terms of secret shares. This requires one RPC between the computing systems MPC$_1$ and MPC$_2$ to multiply two secret shares. At the end of this MPC process, computing system MPC$_1$ has one secret share of the result is_dc_the_winner$_{dc}$ represented as [is_dc_the_winner$_{dc,\ 1}$]= [is_dc_a_candidate$_{dc,\ 1}$]×([acc$_{dc,\ 1}$]==1). Similarly, computing system MPC$_2$ has the other secret share of the result is_dc_the_winner$_{dc}$ represented as [is_dc_the_winner$_{dc,\ 2}$]= [is_dc_a_candidate$_{dc,\ 2}$]×([acc$_{dc,\ 2}$]==1). Note that for all selection values, at most one selection value has a winner parameter is_dc_the_winner$_{dc}$ that is equal to one, which corresponds to the digital component that is selected for distribution to the client device 110. All others would equal zero.

The computing systems MPC$_1$ and MPC$_2$ can calculate the selection result based on the winner parameters for the selection values and the digital component information element dc_information_element for the selection values or the selection values themselves. As described above, the digital component information element dc_information_element for a digital component can include the selection value for the digital component and other data for the digital component.

The computing systems MPC$_1$ and MPC$_2$ can calculate the selection result result$_{F1}$ using relationship 5 below.

$$\text{result}_{F_1} = \Sigma_{dc}\ \text{is\_}dc\text{\_the\_winner}_{dc} \times dc\text{\_information\_element}_{dc} \quad (5)$$

In this example, the selection result result$_{F1}$ will either have a value zero if there are no cached selection values that have a user group identifier that matches a user group identifier of the user or will have a value equal to the digital component information element dc_information_element of the selected digital component that has a is_dc_the_winner$_{dc}$ that is equal to one. In another example, the digital component information element dc_information_element can be replaced in relationship 5 with the selection values for the digital components. In this example, the selection result result$_{F1}$ will either have a value zero if there are no cached selection values that have a user group identifier that matches a user group identifier of the user or will have a value equal to the selection value of the selected digital component that has a is_dc_the_winner$_{dc}$ that is equal to one.

To perform the calculation in secret shares, computing system MPC$_1$ takes all of the cached selection values and multiplies the digital component information element dc_information_element$_{dc}$ for the selection value, which can be in cleartext, by the first secret share of the winner parameter [is_dc_the_winner$_{dc,\ 1}$]. The computing system MPC$_1$ can then determine the sum of these products and return the sum to the client device 110 that submitted the digital component request. That is, computing system MPC$_1$ can determine, as a first share of the result [result$_{F_{1,1}}$], the sum using relationship 6 below.

$$[\text{result}_{F_{1,1}}] = \Sigma_{dc}([\text{is\_}dc\text{\_the\_winner}_{dc,1}] \times dc\text{\_information\_element}_{dc}) \quad (6)$$

The computing system MPC$_2$ can perform a similar calculation to determine the second share of the result [result$_{F_{1,2}}$] using relationship 7 below.

$$[\text{result}_{F_{1,2}}] = \Sigma_{dc}([\text{is\_}dc\text{\_the\_winner}_{dc,2}] \times dc\text{\_information\_element}_{dc}) \quad (7)$$

The computing system MPC$_1$ can return the first share of the selection result [result$_{F_{1,1}}$] to the client device 110. Similarly, the computing system MPC$_2$ can return the second share of the selection result [result$_{F_{1,2}}$] to the client device 110. The application 112 can then reconstruct the selection result result$_{F1}$ in cleartext using the two secret shares [result$_{F_{1,1}}$] and [result$_{F_{1,2}}$], e.g., by determining a sum of the secret shares if additive secret share algorithms are adopted. If the selection result result$_{F1}$ has a value of zero, then the MPC cluster 130 did not identify a digital component for a user group that includes the user as a member. Otherwise, the selection result result$_{F1}$ has a value equal to a digital component information element dc_information_element chosen in the selection process, the application 112 can parse the digital component information element dc_information_element to obtain the selection value and the metadata for the digital component. The application 112 can then either display the digital component or perform a selection process using the digital component and other digital components received from an SSP 170, as described above.

In a two-table cuckoo filter implementation where an element can be inserted into one of two possible locations, the application 112 can receive two selection results, one for each hash function F$_1$ and F$_2$. In this example, the application 112 can select a digital component from a set of digital components that includes both of these digital components and any digital components received from the SSP 170.

In some implementations, the application 112 can perform a final verification that the user group for the digital component(s) selected by the MPC cluster 130 matches a user group that includes the user as a member. For example, the digital component information element dc_information_element for each digital component can include the user group identifier(s) for the digital component. The application 112 can compare the user group identifier(s) of the digital component information element dc_information_element to the user group list for the user. If there is no match, the application 112 can exclude the digital component from the selection process. If there is a match, the application 112 can include the digital component in the selection process.

As described above, receiving two selection results from the MPC cluster 130 can facilitate selection value scrapping. To reduce this risk, the MPC cluster 130 can perform a process to return only one selection result.

In a one-table cuckoo filter implementation, each user group identifier ug_id can show up in two places whose indices are F$_1$(ug_id) and F$_2$(ug_id). Let M represent the one-table cuckoo filter and M$_i$ represent the value of the i-th element in the table. The candidate parameter is_dc_a_candidate$_{dc}$ for a selection value for a digital component with the user group identifier ug_id is true if either M$_{F_1(ug\_id)}$==ug_id or M$_{F_2(ug\_id)}$==ug_id. This MPC cluster 130 can calculate candidate parameter is_dc_a_candidate$_{dc}$ for the selection value using either relationship 8 or 9 below.

$$\text{is\_}dc\text{\_a\_candidate}_{dc} = (M_{F_1(ug\_id)} == ug\_id) + (M_{F_2(ug\_id)} == ug\_id) \quad (8)$$

$$\text{is\_}dc\text{\_a\_candidate}_{dc} = ((M_{F_1(ug\_id)} - ug\_id) \times (M_{F_2(ug\_id)} - ug\_id)) == 0 \quad (9)$$

Relationship 8 can require two equality tests that can be performed in parallel. Relationship 9 can require one equality test and one multiplication. When performing these operations over secret shares using a secure MPC process, multiplication requires less computation and one round trip but an equality test can require more computation and four roundtrips in a probabilistic solution. Thus, relationship 8 can require one less round trip but more computation than relationship 9.

The computing system $MPC_1$ can calculate, based on relationship 8, the candidate parameter is_dc_a_candidate$_{dc}$ for the selection value over secret shares using relationship 10 below.

$$[\text{is\_}dc\_a\_\text{candidate}_{dc,1}] = (ug\_id == [g_{ug\_id,1}(F_1(ug\_id))]) + (ug\_id == [g_{ug\_id,1}(F_2(ug\_id))]) \quad (10)$$

Similarly, computing system $MPC_2$ can calculate, based on relationship 8, the candidate parameter is_dc_a_candidate$_{dc}$ for the selection value over secret shares using relationship 11 below.

$$[\text{is\_}dc\_a\_\text{candidate}_{dc,2}] = (ug\_id == [g_{ug\_id,2}(F_1(ug\_id))]) + (ug\_id == [g_{ug\_id,2}(F_2(ug\_id))]) \quad (11)$$

The computing system $MPC_1$ can calculate, based on relationship 9, the candidate parameter is_dc_a_candidate$_{dc}$ for the selection value over secret shares using relationship 12 below.

$$[\text{is\_}dc\_a\_\text{candidate}_{dc,1}] = ((ug\_id - [g_{ug\_id,1}(F_1(ug\_id))]) \times (ug\_id - [g_{ug\_id,1}(F_2(ug\_id))])) == 0 \quad (12)$$

The computing system $MPC_1$ can calculate, based on relationship 9, the candidate parameter is_dc_a_candidate$_{dc}$ for the selection value over secret shares using relationship 13 below.

$$[\text{is\_}dc\_a\_\text{candidate}_{dc,2}] = ((ug\_id - [g_{ug\_id,2}(F_1(ug\_id))]) \times (ug\_id - [g_{ug\_id,2}(F_2(ug\_id))])) == 0 \quad (13)$$

The MPC cluster 130 can then use a similar process as the process 300 of FIG. 3 to calculate secret shares of the selection result result. In particular, the computing systems $MPC_1$ and $MPC_2$ can calculate, for each selection value, the secret shares [acc$_{dc, 1}$] and [acc$_{dc, 2}$] of the accumulated value acc, respectively, based on the order of the selection values and the candidate parameters for the selection values.

The computing systems $MPC_1$ and $MPC_2$ can calculate, for each selection value, the secret shares [is_dc_the_winner$_{dc, 1}$] and [is_dc_the_winner$_{dc, 2}$] of the winner parameter is_dc_the_winner, respectively, based on the candidate parameter for the selection value and whether the accumulated value for the selection value equals one.

The computing systems $MPC_1$ and $MPC_2$ can calculate secret shares [result$_1$] and [result$_2$] of the selection result result, using relationships 14 and 15 below.

$$[\text{result}_1] = \Sigma_{dc}([\text{is\_}dc\_\text{the\_winner}_{dc,1}] \times dc\_\text{information\_element}_{dc}) \quad (14)$$

$$[\text{result}_2] = \Sigma_{dc}([\text{is\_}dc\_\text{the\_winner}_{dc,2}] \times dc\_\text{information\_element}_{dc}) \quad (15)$$

The computing system $MPC_1$ can return the first share of the selection result [result$_1$] to the application 112 and computing system $MPC_2$ can return the second share of the selection result [result$_2$] to the application 112. The application 112 can then reconstruct the selection result result using the two secret shares, as described above.

The above description relates to multiplication between secret shares of secret integers whose value is either 0 or 1 to computer logical AND. The above description also relates to 1 minus a secret share of a secret integer whose value is either 0 or 1 to computer logical NOT. In some implementations, alternative solutions can be adopted to evaluate logical expressions with secret shares. For example, to compute the logical AND of additive several secret shares of secret integers whose value are either 0 or 1, the MPC server can compare the sum of those additive secret shares to the number of secret shares. For yet another example, to compute an arbitrary logical expression with secret shares as input, the MPC server can adopt the truth table approach, i.e., computing system $MPC_1$ can build a truth table that contains one row for each possible combination of input secret shares held by $MPC_2$. The computing system $MPC_1$ randomly chooses a secret share for the result, denoted as [result$_1$]. For each row, computing system $MPC_1$ can combine its input secret shares and the speculative input secret shares held by $MPC_2$ to reconstruct the input to the logical expression in cleartext, then evaluate the result of the logical expression. For each row, computing system $MPC_1$ splits the result to two secret shares, one of which is [result$_1$], the other is [result$_2$]. The computing system $MPC_1$ then writes [result$_2$] to the row in the truth table. After computing system $MPC_1$ completes the construction of the truth table, computing system $MPC_2$ can initiate an Oblivious Transfer extension (OTe) to fetch the row in the truth table corresponding to the input secret shares held by $MPC_2$. The fetch result is [result$_2$]. At the end of the above process, computing systems $MPC_1$ and $MPC_2$ hold [result$_1$] and [result$_2$] respectively, which are the secret shares of the logical expression result. The computing system $MPC_1$ has no knowledge of the value of [result$_2$], and computing system $MPC_2$ has no knowledge of the value of [result$_1$]. In some implementations, computing systems $MPC_1$ and $MPC_2$ can evaluate the logical expression to determine is_dc_a_candidate$_{dc,1}$ and is_dc_a_candidate$_{dc,2}$ by constructing a garbled circuit.

Figure 4:
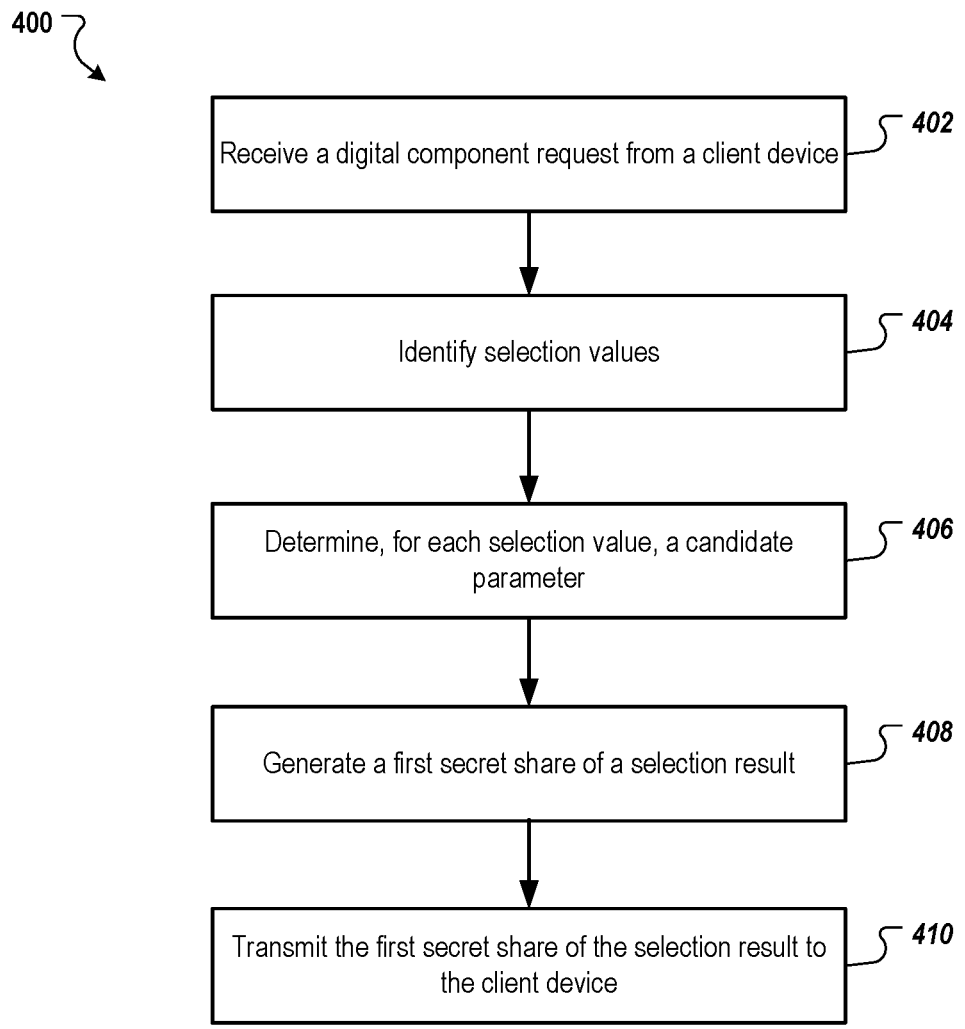
FIG. 4 is a flow diagram that illustrates an example process for selecting a digital component for distribution to a client device.

FIG. 4 is a flow diagram that illustrates an example process 400 for selecting a digital component for distribution to a client device. Operations of the process 400 can be implemented, for example, by the computing system $MPC_1$ or the computing system $MPC_2$ of the MPC cluster 130. Operations of the process 400 can also be implemented as instructions stored on one or more computer readable media which may be non-transitory, and execution of the instructions by one or more data processing apparatus can cause the one or more data processing apparatus to perform the operations of the process 400. For brevity, the process 400 is described as being performed by computing system $MPC_1$.

The computing system $MPC_1$ receives, from a client device 110, a digital component request (402). The digital component request can include one or more distributed point functions. Each distributed point function can represent a secret share of a point function that indicates whether a user of the client device is a member of a respective first user group identified by a respective first user group identifier. For example, the digital component request received by computing system $MPC_1$ can include a distributed point function $g_{ug\_id, 1}$ for each user group that includes the user of the client device 110 as a member.

The digital component request can also include a lookup key. For example, the digital component request can include a user group request key UG_Request_Key, which can be a composite message that is based on a set of contextual signals, e.g., a set of contextual signals of the digital component request. A similar digital component request can be sent to one or more additional MPC systems, e.g., computing system $MPC_2$, that will collaborate with computing system $MPC_1$ in a secure MPC process to select a digital component to provide to the client device 110 in response to the digital component request. Each other digital component request can include, for each distributed point function of the digital component request, a corresponding distributed point function generated for the same user group identifier using the same point function. For example, computing system $MPC_2$ would receive a corresponding distributed point function $g_{ug\_id, 2}$ for each distributed point function $g_{ug\_id, 1}$ received by computing system $MPC_1$.

The computing system $MPC_1$ identifies multiple selection values (404). Each selection value can correspond to a respective digital component and a respective second user group identifier for a respective second user group to which the respective digital component is eligible to be distributed. As described above, the selection values can be stored in a second stage LUT with metadata that identifies its corresponding digital component and with a lookup key that is based on the user group identifier for the selection value and contextual signals for which the selection value is eligible.

The computing system $MPC_1$ determines, for each selection value using a secure MPC process in collaboration with one or more second computing systems of the plurality of MPC systems, a candidate parameter (406). The candidate parameter is_dc_a_candidate indicates whether the second user group identifier corresponding to the selection value matches at least one of the one or more first user group identifiers. That is, the candidate parameter is_dc_a_candidate for a selection value indicates whether the user group identifier for the selection value matches a user group identifier for a user group that includes the user of the client device 110 as a member. If so, the digital component corresponding to the selection value is a candidate digital component that is a candidate for being selected. As described above, computing system $MPC_1$ can collaborate with the one or more additional MPC systems, including computing system $MPC_2$, using a secure MPC process to obtain a first secret share of the candidate parameter is_dc_a_candidate for each selection value.

The computing system $MPC_1$ generates a first secret share of a selection result (408). The computing system $MPC_1$ can collaborate with the one or more additional MPC systems, including computing system $MPC_2$, to generate the selection result. In general, the selection result identifies the candidate digital component having the highest selection value. As described above, the MPC systems can sort the selection values, determine an accumulated value for each selection value, and determine secret shares of a winner parameter is_dc_the_winner for each selection value. The MPC systems can then collaborate to determine, as secret shares of the selection result, secret shares of a sum of, for each selection value, a product of the winner parameter for the selection value and a digital component information element for the selection value. For example, the MPC systems can determine the secret share of the sum of products using relationship 5 shown above.

The computing system $MPC_1$ provides, to the client device 110, the first secret share of the selection result identifying the given digital component (410). As described above, the selection result identifies the selected digital component and the selection value for the digital component. The client device 110 can also receive a respective secret share of the selection result from each of the one or more additional MPC systems. The client device 110 can reconstruct the selection result using the secret shares, as described above.

In some implementations, rather than use distributed point functions, the cuckoo filter itself can be sent to the MPC cluster 130. In this example, the application 112 can use a pseudo random function (PRF) parameterized by either a user group identifier or an identifier from the set of blocked identifiers and either of two random variables generated by the application 112. For example, assume that the three random variables generated by the application 112 are rand_var1a, rand_var1b and rand_var2. Also assume that each item in a bucket is a k-bit integer. In some implementations, the application 112 and the MPC cluster 130 agree on a PRF in advance, where k is the number of bits in each item in a bucket of the cuckoo filter. Each item in a bucket of the cuckoo filter can be occupied by a user group identifier or a blocked identifier, or empty. For example, the application 112 can generate a cuckoo filter table whose items are PRF(ug_id, rand_var1a), PRF(blocked_id, rand_var1b), or 0, where ug_id is the identifier of the user group generated by applying HMAC on the label (e.g., user group identifier) of the user group based on the domain of the content provider and 0 represents an empty item. The process is repeated on all user group identifiers and blocked identifiers.

The application 112 can generate a vector B based on a cuckoo filter table generated for the user group identifiers and blocked identifiers. Each value $B_i$ in the vector B can be represented as $B_i=(A_i\_PRF(rand\_var2, i))$ mod p where A is the cuckoo filter table and i is the index of the vector B and cuckoo filter table A. When the application 112 initiates a request for a digital component for a digital component slot, the application transmits rand_var1a, rand_var1b and rand_var2 as parameters of the request to computing system $MPC_1$. The application 112 also transmits the vector B, rand_var1a and rand_var1b as parameters of the request to computing system $MPC_2$. PRF(rand_var2, i) and $B_i$ are two additive secret shares of $A_i$ in $Z_p$, held by computing systems $MPC_1$ and $MPC_2$ respectively. Because neither of the computing systems $MPC_1$ and $MPC_2$ have access to both the secret shares, neither of the computing systems can recreate the cuckoo filter table, preserving user privacy.

The computing system $MPC_1$ determines whether each candidate selection value is associated with a user group specified in the request. The computing system $MPC_1$ receives the equivalent of an array of secret shares for the cuckoo filter table M, denoted by $[M_1]$. Each user group identifier present in M will be in one of N possible locations.

The computing system $MPC_1$ calculates the user group-based candidate parameter [is_dc_a_candidate$_{x,1}$] according to relationship 16 below:

$$0==\Pi_{i=1}^{N}([M_{F_i(ug\_id(x)),1}]-PRF(ug\_id(x),rand\_val1a))$$
$$\text{AND } 0 \neq \Pi_{i=1}^{N}([M_{F_i(block\_id(x)),1}]-PRF(block\_id(x),rand\_val1b)) \quad (16)$$

where Π denotes the multiplication of multiple items. Here, ug_id(x) is a function used to retrieve the user group identifier ug_id associated with a selection value x, $\{F_1, \ldots F_N\}$ is a set of hash functions to calculate possible index of an item within the cuckoo filter table A, and rand_val1a is the random value received in the digital component request. $[M_{x,1}]$ is the x-th element in the array $[M_1]$. == is the equality test between a cleartext integer and a secret share of a secret integer. The result of == is a secret share of a secret integer that is either 0 (not equal) or 1 (equal). Here, the value of $[M_{i,1}]=[PRF(rand\_val2a, i)_1]$.

Similarly, computing system $MPC_2$ calculates user group-based candidate parameter [is_dc_a_candidate$_{x,2}$] according to relationship 17 below:

$$0==\Pi_{i=1}^{N}([M_{F_i(ug\_id(x)),2}]-PRF(ug\_id(x),rand\_val1a))$$
$$\text{AND } 0 \neq \Pi_{i=1}^{N}([M_{F_i(block\_id(x)),2}]-PRF(block\_id(x),rand\_val1b)) \quad (17)$$

Here, the value of $[M_{i,2}]=B_i$.

Figure 5:
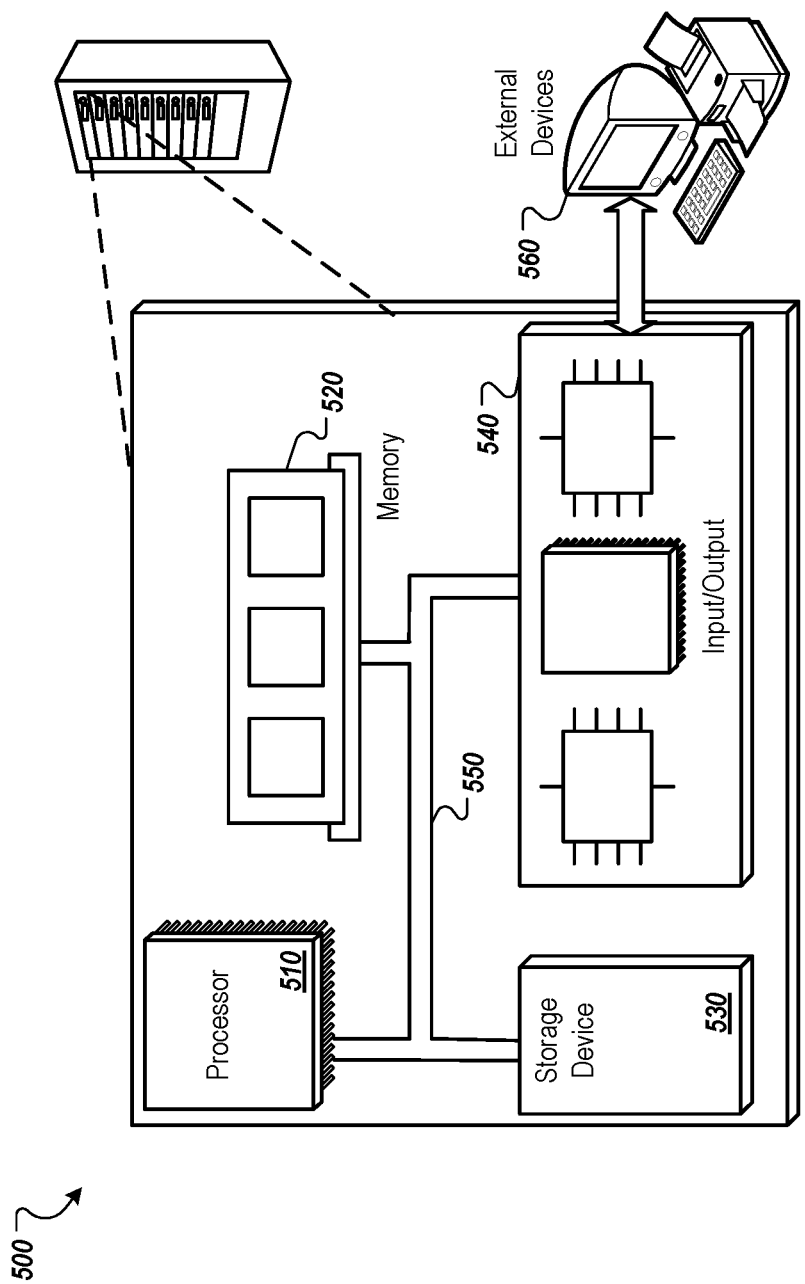
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In addition to the embodiments described above, the following embodiments are also innovative:

Embodiment 1 is a method including receiving, from a client device and by a first computing system of a plurality of multi-party computation (MPC) systems, a digital component request comprising distributed point functions that each represent a secret share of a respective point function that indicates whether a user of the client device is a member of a respective first user group identified by a respective first user group identifier; identifying a plurality of selection values, wherein each selection value corresponds to a respective digital component, a set of contextual signals, and a respective second user group identifier for a respective second user group to which the respective digital component is eligible to be distributed; determining, for each selection value and using the distributed point functions in a secure MPC process performed in collaboration with one or more second computing systems of the plurality of MPC systems, a candidate parameter that indicates whether the second user group identifier corresponding to the selection value matches a user group that includes the user as a member; generating, based on the selection values and the candidate parameters, a first secret share of a selection result that identifies, from a plurality of candidate digital components, a given digital component having a highest selection value, wherein each candidate digital component is a digital component for which the candidate parameter for the selection value corresponding to the digital component indicates that the second user group identifier corresponding to the selection value matches a user group that includes the user as a member; and transmitting, to the client device, the first secret share of a selection result identifying the given digital component.

Embodiment 2 is the method of embodiment 1, wherein determining the candidate parameter for each selection value comprises determining a first secret share of the candidate parameter for each selection value.

Embodiment 3 is the method of embodiment 1 or 2, wherein generating the first secret share of the selection result comprises: generating an order of the selection values based on a magnitude of each selection value; determining, based on the order of the selection values and the candidate parameter for each selection value, a first secret share of an accumulated value for each selection value, wherein the accumulated value for each selection value indicates a position of the selection value in a ranked order of the plurality of candidate selection values; determining, for each selection value, a first secret share of a winner parameter based on (i) the candidate parameter for the selection value and (ii) a result of an equality test that indicates whether the accumulated value for the selection value is a specified value; and determining, as the first secret share of the selection result, a first secret share of a sum of, for each selection value, a product of the winner parameter for the selection value and a digital component information element for the selection value.

Embodiment 4 is the method of embodiment 3, wherein determining the first secret share of the accumulated value for each selection value comprises: for each individual selection value, determining a quantity of selection values, between a highest selection value and the individual selection value, that have a candidate parameter that indicates that the second user group identifier corresponding to the selection value matches at least one of the one or more first user group identifiers.

Embodiment 5 is the method of embodiment 3 or 4, wherein the specified value is one or logical true.

Embodiment 6 is the method of any one of embodiments 1-5, wherein the distributed point functions are generated based on a plurality of user groups that include the user of the client device as a member.

Embodiment 7 is the method of any one of embodiments 1-6, wherein: the digital component request comprises a user group request key that is based on a set of contextual signals for a digital component slot; and identifying the plurality of selection values comprises identifying, in a data structure, each selection value that has a lookup key that matches the user group request key.

Embodiment 8 is a system comprising: one or more processors; and one or more storage devices storing instructions that, when executed by the one or more processors, cause the one or more processor to carry out the method of any one of embodiments 1-7.

Embodiment 9 is a computer readable storage medium carrying instructions that, when executed by one or more processors, cause the one or more processors to carry out the method of any one of embodiments 1-7.

Embodiment 10 is a computer program product comprising instructions which, when executed by a computer, cause the computer to carry out the steps of the method of any of embodiments 1-7.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, from a client device and by a first computing system of a plurality of multi-party computation (MPC) systems, a digital component request comprising distributed point functions that each represent a secret share of a respective point function that indicates whether a user of the client device is a member of a respective first user group identified by a respective first user group identifier;
identifying a plurality of selection values, wherein each selection value corresponds to a respective digital component, a set of contextual signals, and a respective second user group identifier for a respective second user group to which the respective digital component is eligible to be distributed;
determining, for each selection value and using the distributed point functions in a secure MPC process performed in collaboration with one or more second computing systems of the plurality of MPC systems, a candidate parameter that indicates whether the second user group identifier corresponding to the selection value matches a user group that includes the user as a member;
generating, based on the selection values and the candidate parameters, a first secret share of a selection result that identifies, from a plurality of candidate digital components, a given digital component having a highest selection value, wherein each candidate digital component is a digital component for which the candidate parameter for the selection value corresponding to the digital component indicates that the second user group identifier corresponding to the selection value matches a user group that includes the user as a member; and
transmitting, to the client device, the first secret share of a selection result identifying the given digital component.

2. The computer-implemented method of claim 1, wherein determining the candidate parameter for each selection value comprises determining a first secret share of the candidate parameter for each selection value.

3. The computer-implemented method of claim 1, wherein generating the first secret share of the selection result comprises:
generating an order of the selection values based on a magnitude of each selection value;
determining, based on the order of the selection values and the candidate parameter for each selection value, a first secret share of an accumulated value for each selection value, wherein the accumulated value for each selection value indicates a position of the selection value in the order of the selection values;
determining, for each selection value, a first secret share of a winner parameter based on (i) the candidate parameter for the selection value and (ii) a result of an equality test that indicates whether the accumulated value for the selection value is a specified value; and
determining, as the first secret share of the selection result, a first secret share of a sum of, for each selection value, a product of the winner parameter for the selection value and a digital component information element for the selection value.

4. The computer-implemented method of claim 3, wherein determining the first secret share of the accumulated value for each selection value comprises:
for each individual selection value, determining a quantity of selection values, between a highest selection value and the individual selection value, that have a candidate parameter that indicates that the second user group identifier corresponding to the selection value matches at least one of the one or more first user group identifiers.

5. The computer-implemented method of claim 3, wherein the specified value is one or logical true.

6. The computer-implemented method of claim 1, wherein the distributed point functions are generated based on a plurality of user groups that include the user of the client device as a member.

7. The computer-implemented method of claim 1, wherein:
the digital component request comprises a user group request key that is based on a set of contextual signals for a digital component slot; and
identifying the plurality of selection values comprises identifying, in a data structure, each selection value that has a lookup key that matches the user group request key.

8. A system, comprising:
a first computing system comprising one or more processors; and
one or more computer-readable media storing instructions that, when executed by the one or more processors, cause the one or more processors to perform operations comprising:
receiving, from a client device and by the first computing system of a plurality of multi-party computation (MPC) systems, a digital component request comprising distributed point functions that each represent a secret share of a respective point function that indicates whether a user of the client device is a member of a respective first user group identified by a respective first user group identifier;
identifying a plurality of selection values, wherein each selection value corresponds to a respective digital component, a set of contextual signals, and a respective second user group identifier for a respective second user group to which the respective digital component is eligible to be distributed;
determining, for each selection value and using the distributed point functions in a secure MPC process performed in collaboration with one or more second computing systems of the plurality of MPC systems, a candidate parameter that indicates whether the second user group identifier corresponding to the selection value matches a user group that includes the user as a member;
generating, based on the selection values and the candidate parameters, a first secret share of a selection result that identifies, from a plurality of candidate digital components, a given digital component having a highest selection value, wherein each candidate digital component is a digital component for which the candidate parameter for the selection value corresponding to the digital component indicates that the second user group identifier corresponding to the selection value matches a user group that includes the user as a member; and
transmitting, to the client device, the first secret share of a selection result identifying the given digital component.

9. The system of claim 8, wherein determining the candidate parameter for each selection value comprises determining a first secret share of the candidate parameter for each selection value.

10. The system of claim 8, wherein generating the first secret share of the selection result comprises:
generating an order of the selection values based on a magnitude of each selection value;
determining, based on the order of the selection values and the candidate parameter for each selection value, a first secret share of an accumulated value for each selection value, wherein the accumulated value for each selection value indicates a position of the selection value in the order of the selection values;
determining, for each selection value, a first secret share of a winner parameter based on (i) the candidate parameter for the selection value and (ii) a result of an equality test that indicates whether the accumulated value for the selection value is a specified value; and
determining, as the first secret share of the selection result, a first secret share of a sum of, for each selection value, a product of the winner parameter for the selection value and a digital component information element for the selection value.

11. The system of claim 10, wherein determining the first secret share of the accumulated value for each selection value comprises:
for each individual selection value, determining a quantity of selection values, between a highest selection value and the individual selection value, that have a candidate parameter that indicates that the second user group identifier corresponding to the selection value matches at least one of the one or more first user group identifiers.

12. The system of claim 11, wherein the specified value is one or logical true.

13. The system of claim 8, wherein the distributed point functions are generated based on a plurality of user groups that include the user of the client device as a member.

14. The system of claim 8, wherein:
the digital component request comprises a user group request key that is based on a set of contextual signals for a digital component slot; and
identifying the plurality of selection values comprises identifying, in a data structure, each selection value that has a lookup key that matches the user group request key.

15. One or more non-transitory computer-readable media storing instructions that, when executed by one or more processors of a first computing system, cause the one or more processors to perform operations comprising:
receiving, from a client device and by the first computing system of a plurality of multi-party computation (MPC) systems, a digital component request comprising distributed point functions that each represent a secret share of a respective point function that indicates whether a user of the client device is a member of a respective first user group identified by a respective first user group identifier;
identifying a plurality of selection values, wherein each selection value corresponds to a respective digital component, a set of contextual signals, and a respective second user group identifier for a respective second user group to which the respective digital component is eligible to be distributed;
determining, for each selection value and using the distributed point functions in a secure MPC process performed in collaboration with one or more second computing systems of the plurality of MPC systems, a candidate parameter that indicates whether the second user group identifier corresponding to the selection value matches a user group that includes the user as a member;
generating, based on the selection values and the candidate parameters, a first secret share of a selection result that identifies, from a plurality of candidate digital components, a given digital component having a highest selection value, wherein each candidate digital component is a digital component for which the candidate parameter for the selection value corresponding to the digital component indicates that the second user group identifier corresponding to the selection value matches a user group that includes the user as a member; and transmitting, to the client device, the first secret share of a selection result identifying the given digital component.

16. The one or more non-transitory computer-readable media of claim 15, wherein determining the candidate parameter for each selection value comprises determining a first secret share of the candidate parameter for each selection value.

17. The one or more non-transitory computer-readable media of claim 15, wherein generating the first secret share of the selection result comprises:
   generating an order of the selection values based on a magnitude of each selection value;
   determining, based on the order of the selection values and the candidate parameter for each selection value, a first secret share of an accumulated value for each selection value, wherein the accumulated value for each selection value indicates a position of the selection value in the order of the selection values;
   determining, for each selection value, a first secret share of a winner parameter based on (i) the candidate parameter for the selection value and (ii) a result of an equality test that indicates whether the accumulated value for the selection value is a specified value; and
   determining, as the first secret share of the selection result, a first secret share of a sum of, for each selection value, a product of the winner parameter for the selection value and a digital component information element for the selection value.

18. The one or more non-transitory computer-readable media of claim 17, wherein determining the first secret share of the accumulated value for each selection value comprises:
   for each individual selection value, determining a quantity of selection values, between a highest selection value and the individual selection value, that have a candidate parameter that indicates that the second user group identifier corresponding to the selection value matches at least one of the one or more first user group identifiers.

19. The one or more non-transitory computer-readable media of claim 18, wherein the specified value is one or logical true.

20. The one or more non-transitory computer-readable media of claim 15, wherein the distributed point functions are generated based on a plurality of user groups that include the user of the client device as a member.

* * * * *